United States Patent [19]

Hurt

[11] 4,120,513
[45] Oct. 17, 1978

[54] IMPLEMENT TRAILER
[75] Inventor: Henry Wayne Hurt, Lubbock, Tex.
[73] Assignee: Lubbock Manufacturing Company, Lubbock, Tex.
[21] Appl. No.: 821,594
[22] Filed: Aug. 4, 1977
[51] Int. Cl.[2] .............................................. B62D 53/06
[52] U.S. Cl. ............................ 280/423 B; 280/43.23
[58] Field of Search ........... 280/423 B, 423 R, 425 A, 280/43.23; 214/505, 506

[56] References Cited

U.S. PATENT DOCUMENTS

| | | | |
|---|---|---|---|
| 2,858,950 | 11/1958 | Martin | 214/505 |
| 2,967,720 | 1/1961 | Smith | 280/425 A |
| 3,561,732 | 2/1971 | Pulcini | 280/425 A |
| 3,756,443 | 9/1973 | Verschage | 280/423 B |

Primary Examiner—Kenneth H. Betts
Assistant Examiner—R. Schrecengost
Attorney, Agent, or Firm—Wendell Coffee

[57] ABSTRACT

The main bed of an implement trailer is lowered to the ground by pivoting a rear frame and forward gooseneck toward the main bed. The main bed is raised from the ground by pivoting the rear frame and forward gooseneck away from the main bed. A battery, electric motor, and hydraulic pump mounted on the gooseneck provide hydraulic pressure to operate hydraulic cylinders connecting the rear frame and gooseneck to the main bed. The battery is recharged from a towing vehicle.

16 Claims, 7 Drawing Figures

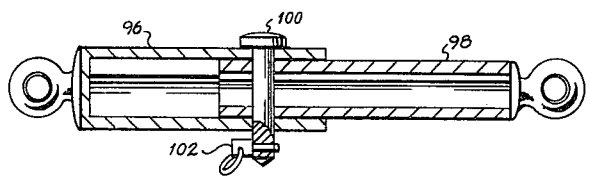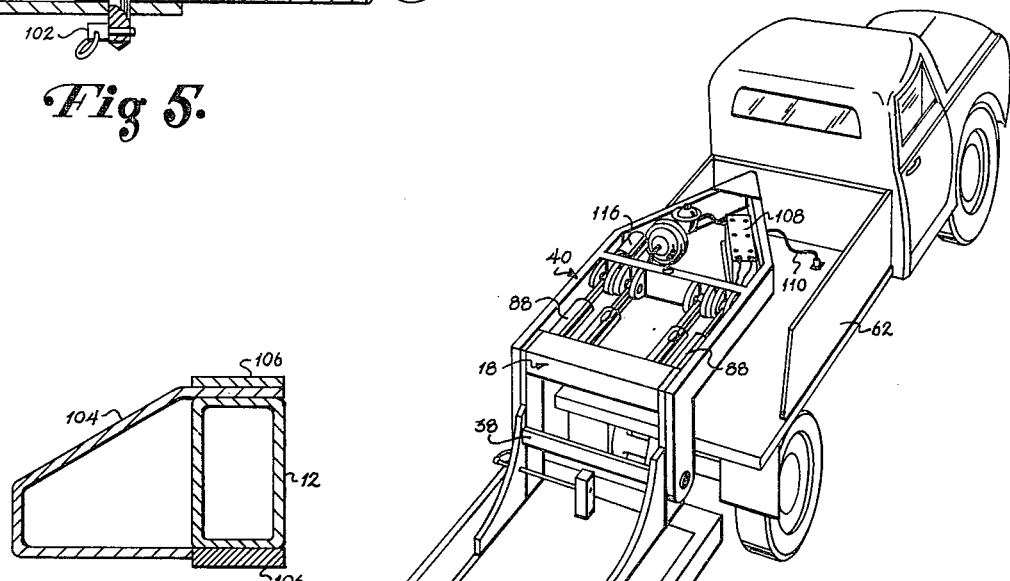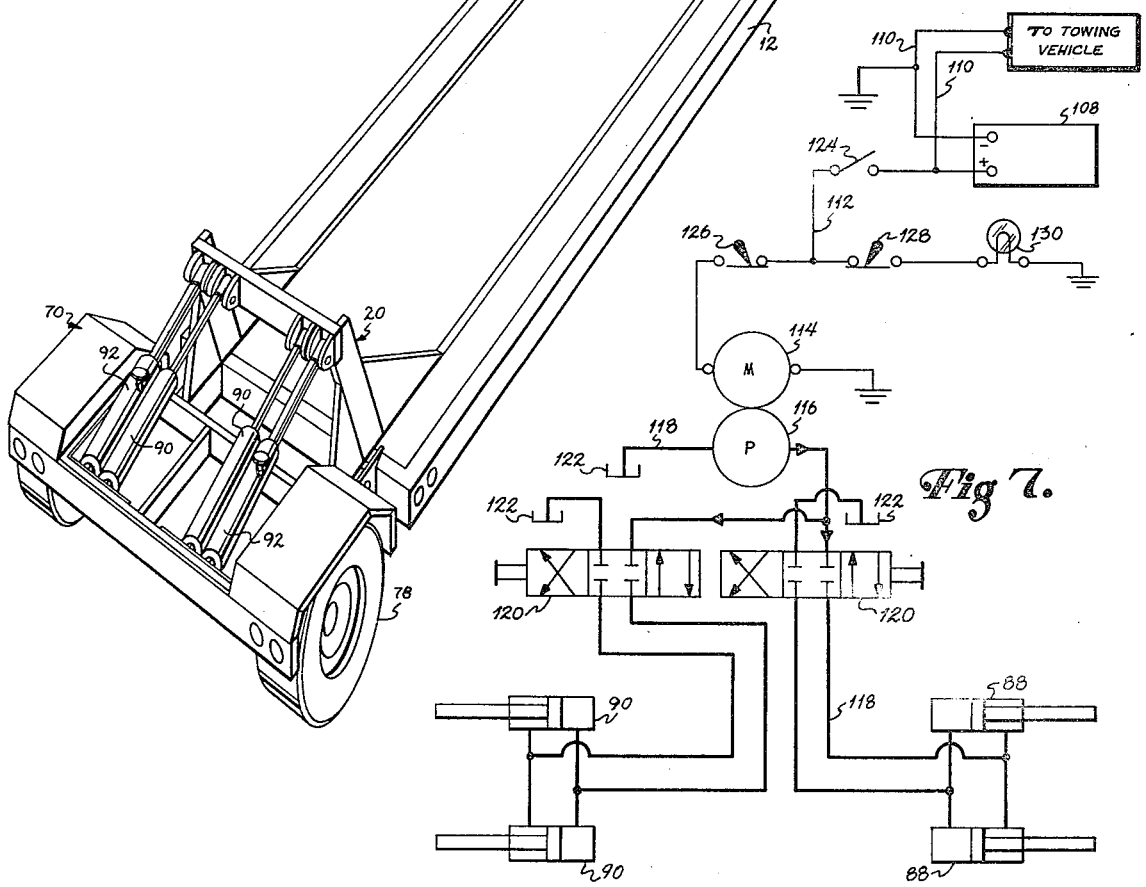

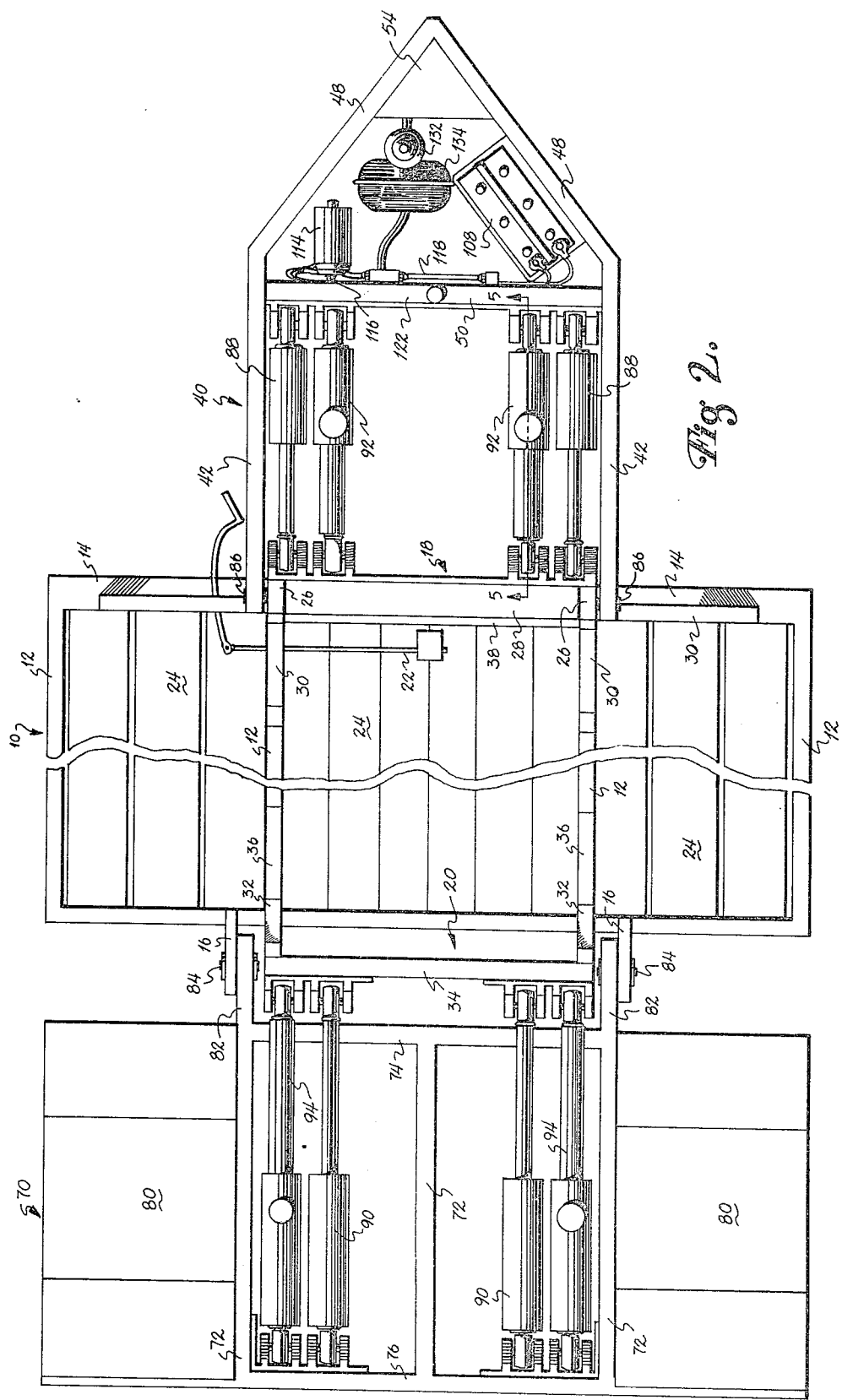

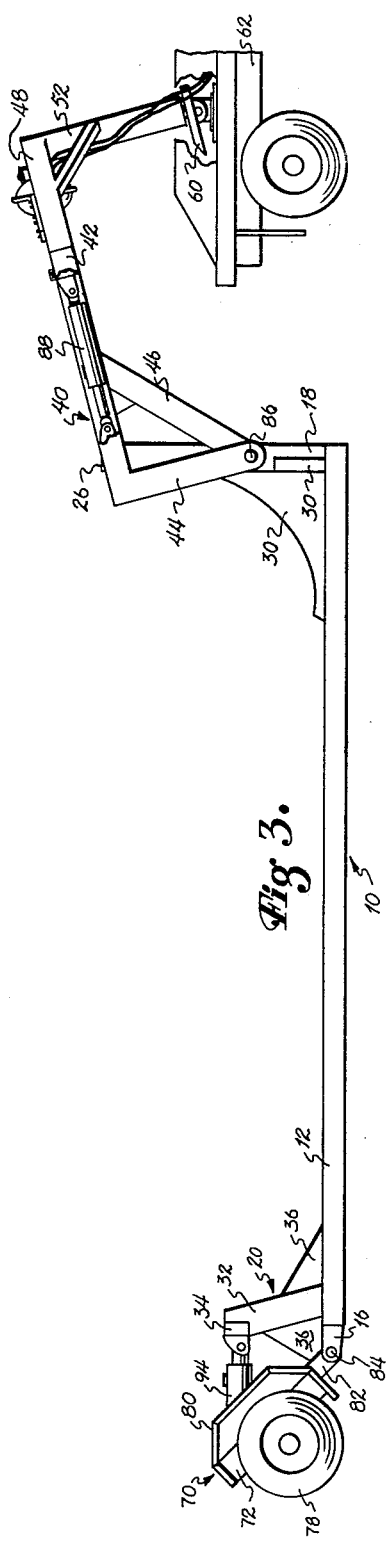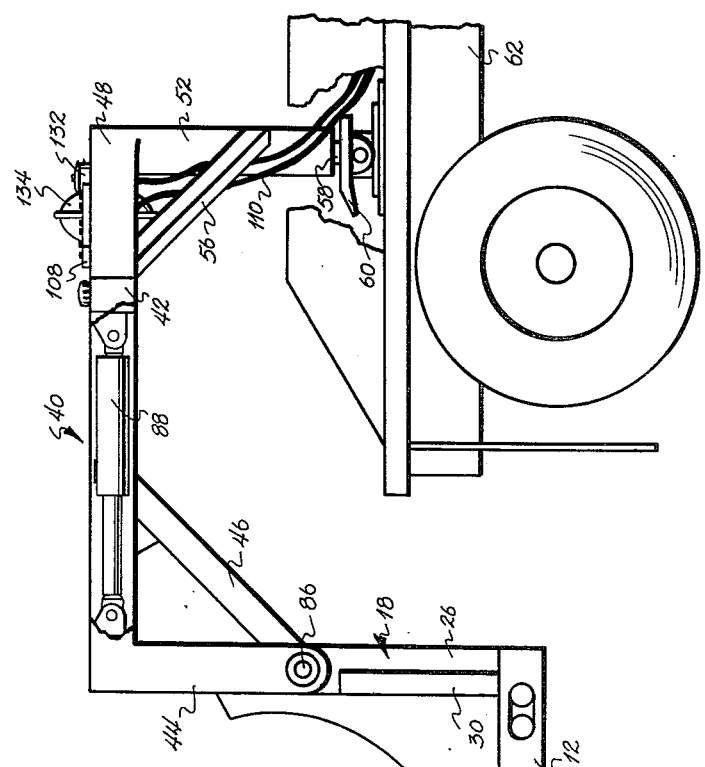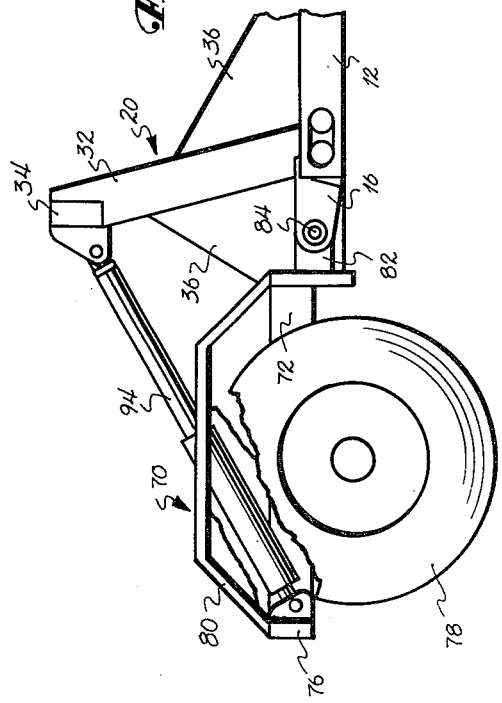

IMPLEMENT TRAILER

CROSS-REFERENCE TO RELATED APPLICATIONS

None. However, Disclosure Document No. 056773 was filed on Jan. 10, 1977, which document concerns this application; therefore, by separate paper, it is respectfully requested that the document be retained.

BACKGROUND OF THE INVENTION (1) Field of the Invention

This invention relates to gooseneck trailers for transporting bulky items, and more particularly to such trailers which lower to the ground for easy loading.

(2) Description of the Prior Art

Before my invention, difficulty was often encountered in loading large implements such as farm equipment on flatbed trailers because the implements could not be raised to a height sufficient to permit them to be placed on the main bed of the trailer.

Various workers have solved this problem in different ways. Some lower the main bed by raising all the wheels of a four-wheeled trailer. Others lower the main bed by raising the rear wheels of a trailer and lowering the frame at the front from a stationary trailer tongue.

Still other workers employ various ramp arrangements to elevate the load or implement rather than lower the trailer. However, none of these prior devices have solved this problem in connection with gooseneck trailers.

I was aware of the following references before filing this application:

Machan, U.S. Pat. Nos. 3,910,436; Struthers, 2,969,989; Moore, 3,633,776; Westborg, 2,869,887; Dobson, 3,544,127; Bennett et al, 2,831,735; Fulmer et al, 3,339,766; Lesser, 2,753,064; Bogh et al, 3,322,292; Schmied, 2,387,093; Lundahl, 3,003,780; Dabrasky, 2,199,392.

SUMMARY OF THE INVENTION

New and Different Function

I have solved the problem of loading large implements on a gooseneck trailer. My invention lowers the main bed by pivoting the gooseneck and rear member of the trailer about their points of connection to the main bed. As hydraulic cylinders between the end members and the bed are operated, the gooseneck and rear member pivot about the pivots. When the gooseneck and rear member are pivoted toward the main bed, the main bed is lowered to the ground. When the gooseneck and rear member are pivoted away from the main bed, the main bed is raised above the ground to the traveling position.

I have also increased the utility and economy of the trailer by providing an electric storage battery on the trailer for operating the hydraulics independently of a towing vehicle or external energy supply. The battery is recharged by connecting it with the electric system of a towing vehicle.

Thus the function of the invention as a whole is greater than the sum of the functions of the individual pivots, pump, cylinders, etc.

Objects of the Invention

An object of this invention is to transport implements which cannot easily be lifted to the height necessary to permit loading on a normal flatbed trailer.

Further objects are to achieve the above with a device that is sturdy, compact, durable, lightweight, simple, safe, efficient, versatile, ecologically compatible, energy conserving, and reliable, yet inexpensive and easy to manufacture, attach, adjust, operate and maintain.

Other objects are to achieve the above with a method that is versatile, ecologically compatible, energy conserving, rapid, efficient, and inexpensive, and does not require skilled people to attach, adjust, operate, and maintain.

The specific nature of the invention, as well as other objects, uses, and advantages thereof, will clearly appear from the following description and from the accompanying drawing, the different views of which are not scale drawings.

BRIEF DESCRIPTION OF THE DRAWING

FIG. 1 is a perspective view of an embodiment of this invention hitched to a towing vehicle.

FIG. 2 is a top view of the invention.

FIG. 3 is a side elevation view thereof with the main bed in the lowered position.

FIG. 4 is a side elevation view of the front and rear portions of the invention with parts broken away for clarity.

FIG. 5 is a side section view of a locking member taken substantially on line 5—5 of FIG. 2.

FIG. 6 is a section view of an optional side longitudinal member of the main bed.

FIG. 7 is a schematic representation of the electric and hydraulic systems.

DESCRIPTION OF THE PREFERRED EMBODIMENT

A trailer frame has three main members including main bed 10, gooseneck or forward member or gooseneck member 40, and rear member 70. Main bed 10 includes bed longitudinal beams 12, bed crossbeams 14, rear bed pivot plates 16, front stand 18, rear stand 20, trailer jack 22, and floorboards 24. The front stand 18 includes front stand vertical beams 26 connected by front stand anchor beam 28 and braced by front stand braces 30. The rear stand 20 includes rear stand vertical beams 32 connected by rear stand anchor beam 34 and braced by rear stand braces 36. Front stand crossbrace 38 interconnects the front stand vertical beams 26 at points below their tops.

The gooseneck 40 includes gooseneck longitudinal beams 42 connected to gooseneck pivot beams 44 at one of their respective ends. The gooseneck longitudinal beams and gooseneck pivot beams are braced by gooseneck braces 46. Gooseneck crossbeams 48 are connected to the other ends of the gooseneck longitudinal beams 42 at one end, and to each other at their other end. Gooseneck anchor beam 50 interconnects the gooseneck longitudinal beams 42. Hitch beam 52 is connected to the gooseneck crossbeams 48 and brace plate 54 at one end and is braced by hitch braces 56 connecting the gooseneck crossbeams 48 and the hitch beam 52. Kingpin 58 connected to the other end of hitch beam 52 serves as a coupling shaft to be removably inserted within fifth wheel 60 mounted on towing vehicle 62 to form a universal coupling means. By "universal coupling means", I mean a connection permitting rotation about at least two normal axes.

The rear member 70 includes rear longitudinal beams 72 connected by rear crossbeam 74 and rear anchor beam 76. Wheels 78 are mounted under the rear member 70, and fenders 80 are mounted to two of the rear longitudinal beams 72. Rear pivot plates 82 are welder to the rear anchor beam 76.

Rear pivot pins 84 are located in correlated holes in the rear pivot plates 82 and the rear bed pivot plates 16. Front pivot pins 86 are located in correlated holes in the front stand vertical beams 26 and the gooseneck pivot beams 44 at points below the tops of the front stand vertical beams 26.

Front hydraulic cylinders, or front motor means, 88 interconnect the gooseneck anchor beam 50 and the front stand anchor beam 28. Rear hydraulic cylinders, or rear motor means, 90 interconnect the rear anchor beam 76 and the rear stand anchor beam 34. Although other extensible mechanisms may be used and still be within the scope of my invention, I prefer to use hydraulic cylinders as means for pivoting because equipment and parts to aid in their use are readily available commercially.

Front locking means 92 interconnect the gooseneck anchor beam 50 and the front stand anchor beam 28. Rear locking means 94 connect the rear anchor beam 76 and the rear stand anchor beam 34. Referring to FIG. 5 for a more particular description, locking means 92 and 94 may be seen to include a hollow cylinder 96, with longitudinal rod 98 extending slidably within the hollow cylinder. Locking pin 100 fits within correlated holes through the hollow cylinder 96 and the longitudinal rod 98 and is secured therein by pin retainer 102 in the end of the locking pin. The locking means rigidly fix the position of the end members 40 and 70 with respect to the main bed 10.

I have also provided optional bed side beams on the sides of the main bed 10 in place of the bed longitudinal beams 12, as shown in FIG. 6. The bed longitudinal beam 12 has ramp plate 104 and reinforcing plates 106 welded thereto. The ramp plate 104 facilitates the driving of vehicles with small diameter wheels that are unable to negotiate a step the height of the bed longitudinal member 12 onto the main bed 10. The ramp plate 104 also assists in placing vehicles with a high center of gravity on the main bed 10 by providing a gradual incline rather than a sharp step, which increases the tendency of such vehicle to tip over. Reinforcing plates (not shown) such as those plates 106 may be optionally employed in conjunction with the other frame members to make them stronger.

Referring to FIG. 7, electric storage battery 108, a source of stored energy, and recharge connection means in the form of recharge wires 110 are mounted on the gooseneck 40. The recharge wires 110 connect the battery 108 to a connectable source of electric energy on the towing vehicle 62.

Motor connection means for connecting the battery 108 to the hydraulic cylinders 88 and 90 includes battery wires 112 which connect the battery 108 to electric motor 114; hydraulic pump 116 which is driven by the electric motor 114; and hydraulic connections 118 for connecting the hydraulic pump 116 to the hydraulic cylinders 88 and 90. Valves 120, well known in the art, are located in the hydraulic connections 118 and permit the reversible application of hydraulic pressure through the hydraulic connections 118 on the hydraulic cylinders 88 and 90. I also prefer to run the hydraulic connections or lines 118 from the gooseneck 40 to the rear member 70 through the bed longitudinal beams 12 to protect the lines from damage. For simplicity and economy, I employ the volume within the gooseneck anchor beam 50 as hydraulic fluid reservoir 122.

I prefer to place a key-operated switch 124 in the circuit from the battery 108 to the electric motor 114 to prevent unauthorized operation of the trailer. Toggle switches 126 and 128 are located proximate the key-operated switch 124. Toggle switch 126 controls the electric motor 114 when the key-operated switch 124 is on. Toggle switch 128 controls light 130 located proximate the switches 126, 128, and 124. The motor 114, pump 116, valves 120, toggle switches 126 and 128, light 130, and key-operated switch 124 are conveniently located on the gooseneck 40. The placement of all of these items are not specifically shown in the structural drawing to avoid unnecessarily cluttering the drawing.

Once the components described above have been assembled to form an implement trailer, the operation of the trailer may be seen to occur as follows.

Assume the trailer is located hitched to the towing vehicle 62 having no connectable source of electrical energy, such as a tractor (not shown), in a loading area. A key is turned in key-operated switch 124, and the toggle switch 126 is closed, thereby supplying electric current to the motor 114 from the battery 108. If it is night, once the keyoperated switch 124 is closed, the toggle switch 128 may be closed to turn light 130 on to provide illumination of the controls. The motor 114 drives the pump 116, producing hydraulic pressure. The valves 120 in the hydraulic connections 118 are actuated in a first way to apply hydraulic pressure to the hydraulic cylinders 88 and 90, thereby pivoting the rear member 70 and gooseneck 40 in a first direction and second direction respectively relative to the main bed 10. The gooseneck 40 and rear member 70 are thus pivoted sufficiently to remove tension on the locking pins 100, permitting them to be withdrawn from the hollow cylinders 96 and the longitudinal rods 98.

Referring to FIG. 2, the first direction may be seen to be counterclockwise and the second direction may be seen to be clockwise.

The pressure is then reversed on the hydraulic cylinders 88 and 90 by operating the valves 120 in a second opposite way. This allows the cylinders 88 and 90 to retract, thereby, pivoting the gooseneck 40 about the front pivot pins 86 in a first direction relative to the main bed 10 and pivoting the rear member 70 about the rear pivot pins 84 is a second direction relative to the main bed 10. It may be seen that as the front gooseneck 40 pivots, the front of the main bed 10 will be lowered to the ground, and the gooseneck 40 will be lowered to the ground. The gooseneck 40 will also pivot about the fifth wheel 60 in the first direction relative to the towing vehicle.

At the end of the pivot of the gooseneck 40 and rear member 70, the main bed 10 is resting on the ground. An implement may now be placed on the main bed. At this point the main bed 10 may be raised while hitched to the tractor. When raised, it may be supported by trailer jack 22. Alternatively, the gooseneck may be unhitched from the tractor and the hydraulic controls further operated as before to pivot the gooseneck in the first direction to elevate the kingpin 58. The towing vehicle 62 with a connectable source of electrical energy, such as a truck, may then be backed under the gooseneck 40. The kingpin 58 may then be placed within the fifth wheel 60 by pivoting the gooseneck 40 in the second direction.

An additional benefit of my invention may also be seen, i.e., by pivoting the gooseneck 40 in the first direction, after the main bed is on the ground, the rear wheels of the towing vehicle 62 hitched to the gooseneck 40 may be elevated by operating the hydraulic system, thereby facilitating the removal of the rear wheels to repair a flat fire. By pivoting the rear member 70 in the second direction in the same manner, the wheels 78 may be raised above the ground.

Assuming the gooseneck 40 has now been hitched to the towing vehicle 62 with a connectable source of electrical energy and the recharge wires 110 connected, the main bed 10 with an implement or load thereon may now be raised. The battery 108 will be recharged by the connectable source of energy. After the battery 108 is fully charged, the source of electrical energy on the towing vehicle 62 will operate the electric motor 114. If the source of energy on the towing vehicle 62 is not producing energy, the stored electricity from the battery 108 will operate the electric motor 114.

The hydraulic pressure generated by the pump 116 is applied to cause the hydraulic cylinders 88 and 90 to extend, thereby pivoting the gooseneck 40 about the front pivot pins 86 in the second direction relative to the main bed 10. It may be seen that as the pivoting occurs, the main bed 10 will be raised to a substantially horizontal position above the ground and the gooseneck 40 will also pivot about the fifth wheel 60 in the second direction relative to the towing vehicle 62.

At the end of the pivot of the gooseneck 40 and rear member 70, the main bed 10 is elevated above the ground until the holes in the hollow cylinders 96 and the longitudinal rods 98 are correlated. The locking pins 100 are then inserted, the pin retainers 102 inserted, and the pressure on the hydraulic cylinders 88 and 90 released. The trailer is then ready for travel.

The gooseneck 40 and rear member 70 need not be pivoted simultaneously, but may be operated independently. In addition, although other locking means 92 and 94 may be used, I prefer to employ the locking means described. These locking means are the most effective and efficient available because they are parallel to and have the same force placed upon them as the hydraulic cylinders 88 and 90.

It should also be noted that all lighting and other safety equipment necessary to make the trailer roadworthy is attached to the trailer. In addition, I prefer to mount brakes (not shown) on the trailer, with brake fluid pump 132 and brake reservoir 134 being mounted on the gooseneck 40 opposite the battery 108. Brake lines (not shown) extend within the middle longitudinal beams to brakes (not shown) on the wheels 78.

The embodiment shown and described above is only exemplary. I do not claim to have invented all the parts, elements or steps described. Various modifications can be made in the construction, material, arrangement, and operation, and still be within the scope of my invention. The limits of the invention and the bounds of the patent protection are measured by and defined in the following claims. The restrictive description and drawing of the specific example above do not point out what an infringement of this patent would be, but are to enable the reader to make and use the invention.

As an aid to correlating the terms of the claims to the exemplary drawing, the following catalog of elements is provided:

| | |
|---|---|
| 10 main bed | 76 rear anchor beam |
| 12 bed longitudinal beams | 78 wheels |
| 14 bed crossbeams | 80 fenders |
| 16 rear bed pivot plates | 82 rear pivot plates |
| 18 front stand | 84 rear pivot pins |
| 20 rear stand | 86 front pivot pins |
| 22 trailer jack | 88 front hydraulic cylinders |
| 24 floorboards | 90 rear hydraulic cylinders |
| 26 front stand vertical beams | 97 front locking means |
| 28 front stand anchor beam | 94 rear locking means |
| 30 front stand braces | 96 hollow cylinders |
| 32 rear stand vertical beams | 98 longitudinal rods |
| 34 rear stand anchor beam | 100 locking pins |
| 36 rear stand braces | 102 pin retainer |
| 38 front stand crossbrace | 104 ramp plate |
| 40 gooseneck | 106 reinforcing plates |
| 42 gooseneck long beams | 108 electric storage battery |
| 44 gooseneck pivot beams | 110 recharge wires |
| 46 gooseneck braces | 112 battery wires |
| 48 gooseneck crossbeams | 114 electric motor |
| 50 gooseneck anchor beam | 116 hydraulic pump |
| 52 hitch beam | 118 hydraulic connections |
| 54 brace plate | 120 valves |
| 56 hitch braces | 122 hydraulic fluid reservoir |
| 58 kingpin | 124 key-operated switch |
| 60 fifth wheel | 126 toggle switch |
| 62 towing vehicle | 128 toggle switch |
| 70 rear member | 130 light |
| 72 rear longitudinal beams | 132 brake fluid pump |
| 74 rear crossbeams | 134 brake reservoir |

I claim as my invention:

1. In a trailer having
   a frame with
   (i) a longitudinal axis,
   (ii) a gooseneck connected to
   (iii) a front end of a main bed, and
   (iv) a rear member connected to
   (v) a rear end of said main bed,
   at least two ground engaging wheels connected to the frame,
   universal means for attaching the gooseneck to a towing vehicle; the improved structure comprising in combination with the above:
   a. the front end of the main bed being connected to the gooseneck by front pivots,
   b. front motor means interconnecting the gooseneck and the main bed for pivoting said gooseneck relative to said main bed about the front pivots, and
   c. front locking means for maintaining the gooseneck in a fixed position in relationship to said main bed, said front locking means including
   d. at least one hollow cylinder,
   e. a longitudinal rod slidably fitting within the hollow cylinder, and
   f. a locking pin in correlated holes in the hollow cylinder and rod.

2. The invention as defined in claim 1 with additional limitations of
   g. a towing vehicle attached to the universal means,
   h. a connectable source of energy on the towing vehicle,
   j. motor connection means interconnecting the source of energy and the motor means.

3. The invention as defined in claim 1 wherein said front motor means includes:
   g. a front stand attached to the front of the main bed,
   h. said gooseneck being pivoted to the front stand below the top thereof, and
   j. at least one hydraulic cylinder extending from the gooseneck to the top of the front stand.

4. The invention as defined in claim 1 with additional limitations of
g. a source of stored energy mounted on the frame,
h. motor connection means on the frame for connecting the source of stored energy to the motor means.

5. The invention as defined in claim 4 with additional limitations of
j. a towing vehicle attached to the universal means,
k. a connectable source of electrical energy on the vehicle,
m. recharge connection means interconnecting the vehicle and trailer for recharging the source of stored energy which is an electric storage battery mounted on the frame.

6. The invention as defined in claim 1 with additional limitations of
g. said wheels being positioned under the rear member,
h. the rear end of the main bed being connected to the rear member by rear pivots,
j. rear motor means connecting the rear member with the main bed for pivoting said rear member,
k. rear locking means for maintaining the rear member in a fixed position relative to the main bed.

7. The invention as defined in claim 6 wherein said rear motor means inccludes:
m. a rear stand attached to the rear of the main bed, and
n. at least one hydraulic cylinder extending between the rear stand and the rear member.

8. The invention as defined in claim 7 wherein said front motor means includes:
o. a front stand attached to the front of the main bed,
p. said gooseneck being pivoted to the front stand below the top thereof, and
q. at least one hydraulic cylinder extending from the gooseneck to the top of the front stand.

9. The invention as defined in claim 8 with additional limitations of
r. a source of stored energy mounted on the frame,
s. motor connection means on said frame for connecting the source of stored energy to the motor means.

10. The invention as defined in claim 9 with additional limitations of
t. a towing vehicle attached to the universal means,
u. a connectable source of electrical energy on the vehicle,
v. recharge connection means interconnecting the vehicle and trailer for recharging the source of stored energy by which is an electric storage battery mounted on the frame.

11. The invention as defined in claim 10 wherein said motor connection means includes:
w. an electric motor mounted on the frame electrically connected to said storage battery,
x. a hydraulic pump mounted on the frame drivingly connected to the electric motor, and
y. hydraulic connections extending from said pump to said motor means.

12. The invention as defined in claim 11 wherein said rear locking means includes
z. at least one hollow cylinder,
aa. a longitudinal rod slidably fitting within the hollow cylinder, and
bb. a locking pin in correlated holes in the hollow cylinder and rod.

13. The invention as defined in claim 12 with additional limitations of
cc. said gooseneck having
(i) gooseneck longitudinal beams,
(ii) gooseneck crossbeams,
(iii) gooseneck pivot beams,
(iv) a gooseneck anchor beam,
(v) a hitch beam, and
(vi) said universal coupling means being attached to the hitch beam,
dd. said main bed having
(i) bed longitudinal beams,
(ii) bed crossbeams,
(iii) rear bed pivot plates, and
(iv) a trailer jack,
ee. said front and rear stands having
(i) front stand and rear stand anchor beams,
(ii) front stand and rear stand vertical beams, and
(iii) front stand and rear stand braces, respectively,
ff. said rear member having
(i) rear longitudinal beams,
(ii) rear crossbeams,
(iii) rear anchor beam, and
(iv) rear pivot plates,
gg. said universal coupling means including
(i) a fifth wheel on said towing vehicle,
(ii) a kingpin connected to the hitch beam fitting removably within said fifth wheel,
hh. said front motor means and front locking means being connected to the gooseneck anchor beam on the gooseneck,
jj. said front motor means and front locking means being connected to the front stand anchor beam on the front stand,
kk. said rear motor means and rear locking means being connected to the rear anchor beam on the rear member,
mm. said rear motor means and rear locking means being connected to the rear stand anchor beam on the rear stand,
nn. said front pivot being a pin in correlated holes in the front pivot beams and the front stand vertical beams,
oo. said rear pivot being a pin in correlated holes in the rear bed and rear connection plates, and
pp. a reservoir of hydraulic fluid being within at least one of the beams within the gooseneck.

14. In a trailer having
a. a frame with
(i) a longitudinal axis,
(ii) a gooseneck member connected to
(iii) a front end of a main bed, and
(iv) a rear member connected to
(v) a rear end of said main bed,
b. at least two ground engaging wheels connected to said frame,
c. universal means for attaching said gooseneck member to a towing vehicle;
the improved structure comprising in combination with the above:
d. at least one of said members pivoted to the main bed and
e. at least one hydraulic motor connecting the main bed and said pivoted member,
f. the hydraulic motor providing means for lowering the pivoted end of the main bed to the ground and for raising the pivoted end of the main bed to an elevated position,
g. an electric storage battery mounted on the frame,
h. pump means mounted on the frame for transforming energy from the battery into hydraulic pressure,
j. hydraulic connections on said frame extending from said pump means to said hydraulic motor, k. a towing vehicle attached to said universal means, m. a connectable source of electrical energy on said vehicle, and n. recharge connection means interconnecting the vehicle and trailer for recharging the electric storage battery.

15. The invention as defined in claim 14 wherein said pump means includes o. an electric motor on the frame connected to the electric storage battery by p. electric wires, q. the electric motor being drivingly connected to a hydraulic pump, and r. the hydraulic connections connecting the hydraulic pump with the hydraulic motors.

16. In a trailer having a. a frame with
   (i) a longitudinal axis,
   (ii) a gooseneck connected to
   (iii) a front end of a main bed, and
   (iv) a rear member connected to
   (v) a rear end of said main bed, b. at least two ground engaging wheels connected to the frame, c. universal means for attaching the gooseneck to a towing vehicle, d. a source of energy is mounted on a towing vehicle and said source of energy is connected to the source of stored energy on the frame;

the improved method for raising and lowering the main bed of said trailer wherein the gooseneck and the rear member are connected to the main bed by front and rear pivots and hydraulic cylinder for pivoting the gooseneck and rear member relative to the main bed and a source of stored energy is mounted on the frame, comprising the steps of:

e. transforming energy from the source of stored energy into hydraulic pressure, f. placing and withdrawing said pressure on the hydraulic cylinders, thereby g. extending and retracting the hydraulic cylinders, thereby h. pivoting the gooseneck and rear member relative to the main bed, and j. recharging the source of stored energy with energy from the source of energy on the towing vehicle.

* * * * *